(12) United States Patent
Jallouli

(10) Patent No.: US 7,439,278 B2
(45) Date of Patent: Oct. 21, 2008

(54) CURABLE ADHESIVE COMPOSITION AND ITS USE IN THE OPTICAL FIELD

(75) Inventor: Aref Jallouli, Largo, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 10/838,840

(22) Filed: May 4, 2004

(65) Prior Publication Data

US 2005/0250870 A1 Nov. 10, 2005

(51) Int. Cl.
| C08F 2/50 | (2006.01) |
| B32B 27/30 | (2006.01) |
| B29C 65/14 | (2006.01) |
| B32B 27/00 | (2006.01) |
| B29C 65/00 | (2006.01) |
| G02B 1/00 | (2006.01) |
| G02B 1/04 | (2006.01) |

(52) U.S. Cl. ................ 522/103; 522/100; 522/181; 522/172; 522/182; 522/134; 522/135; 522/137; 522/144; 522/113; 522/114; 522/121; 427/516; 427/517; 427/508; 428/413; 156/228; 156/99; 156/74; 156/275.5

(58) Field of Classification Search ............... 522/100, 522/181, 172, 182, 130, 103, 134, 135, 137, 522/113, 114, 121, 120, 144; 427/508, 516, 427/517; 428/413; 156/228, 99, 74, 275.5
See application file for complete search history.

(56) References Cited

U.S. PATENT DOCUMENTS

| 5,434,196 | A | * | 7/1995 | Ohkawa et al. | ............. 522/100 |
| 5,525,645 | A | * | 6/1996 | Ohkawa et al. | ............... 522/74 |
| 6,023,545 | A | | 2/2000 | Eldada et al. | .................. 385/37 |
| 6,288,136 | B1 | * | 9/2001 | Ukon et al. | .................. 522/100 |
| 6,491,851 | B1 | | 12/2002 | Keller et al. | ................ 264/1.32 |
| 6,562,466 | B2 | * | 5/2003 | Jiang et al. | .................. 428/412 |
| 2002/0138921 | A1 | | 10/2002 | Baileet | ......................... 8/507 |
| 2003/0017340 | A1 | | 1/2003 | Jiang et al. | .................. 428/412 |
| 2003/0083400 | A1 | | 5/2003 | Jia | .............................. 523/116 |
| 2003/0212194 | A1 | | 11/2003 | Jia | .............................. 524/556 |

FOREIGN PATENT DOCUMENTS

| FR | 2792010 | 10/2000 |
| WO | WO 99/29494 | 6/1999 |
| WO | WO 03/004255 | 1/2003 |
| WO | WO 03/040461 | 5/2003 |

* cited by examiner

*Primary Examiner*—Sanza L McClendon
(74) *Attorney, Agent, or Firm*—Fulbright & Jaworski L.L.P.

(57) ABSTRACT

The invention concerns a photocurable adhesive composition comprising, based on total weight of photopolymerizable monomers and/or oligomers of the composition:
- (A1) 20 to 80 wt % of at least one diacrylate monomer or oligomer thereof (A1);
- (A2) 80 to 20 wt % of at least one dimethacrylate monomer or oligomer thereof;
- (B) 0 to 50 wt %, of at least one copolymerizable monomer different from components (A1) and (A2);

with the proviso that the composition is free from any thio (meth)acrylate (—SCOCR'=CH$_2$, with R'=H or CH$_3$) monomer or oligomer thereof.

72 Claims, 3 Drawing Sheets

CURABLE ADHESIVE COMPOSITION AND ITS USE IN THE OPTICAL FIELD

BACKGROUND OF THE INVENTION

The present invention relates to a curable, preferably photocurable, adhesive composition and its use in the optical field.

It is a common practice in the art to coat at least one face of an ophthalmic lens with several coatings for imparting to the finished lens additional or improved optical or mechanical properties.

Thus, it is usual practice to coat at least one face of an ophthalmic lens, typically made of an organic glass material, with successively, starting from the face of the lens, an impact resistant coating (impact resistant primer), a scratch resistant coating (hard coat), an anti-reflecting coating and, optionally, a hydrophobic top coat. Other coatings such as polarized coating, photochromic or dying coating may also be applied onto one or both faces of the ophthalmic lens.

Numerous processes and methods have been proposed for coating a face of an ophthalmic lens and are disclosed.

US 2003/0017340 describes one process or method for transferring a coating from at least one mold part onto at least a geometrically defined surface of a lens blank which comprises:

providing a lens blank having at least one geometrically defined surface;

providing a support or mold part having an internal surface bearing a coating and an external surface;

depositing on said geometrically defined surface of said lens blank or on said coating a pre-measured amount of a curable adhesive composition;

moving relatively to each other the lens blank and the support to either bring the coating into contact with curable adhesive composition or bring the curable adhesive composition into contact with the geometrically defined surface of the lens blank;

applying a sufficient pressure onto the external surface of the support so that the thickness of a final adhesive layer once the curable composition cured is less than 100 micrometers;

curing the layer of adhesive composition; and withdrawing the support or mold part to recover the lens blank with the coating adhered onto the geometrically defined surface of said lens blank.

By pre-measured amount, one means a sufficient amount of curable adhesive composition to obtain transfer and adhesion of the coating to the lens blank.

Preferably the coating is transferred to the back surface of the lens blank (back side treatment or BST).

The curable adhesive composition not only must allow a quick and safe transfer of the coating from the support onto the lens blank surface and a good adhesion of the coating onto the lens blank surface but also must not impair the optical and mechanical properties of the resulting ophthalmic lens, such as good adhesion, haze, no application stain and resistance to thermal cracking (critical temperature).

Application stain refers to the existence of an area of increased haze level, on the lens blank, coinciding with the initial adhesive composition application area. Application stain is particularly severe when using tinted lens blanks. The Haze may be observed if the adhesive composition is allowed to sit on the lens blank surface for longer than 20 seconds before undergoing the surface transfer process.

WO 03/004255 discloses that curable glue or adhesive can be polyurethane compounds, epoxy compounds, (meth)acrylate compounds such as polyethyleneglycol di(meth)acrylate, ethoxylated bisphenol-A di(meth)acrylates.

Preferred compounds for the curable glue or adhesive are acrylate compounds such as polyethyleneglycol diacrylates, ethoxylated bisphenol-A diacrylate, various trifunctional acrylates such as (ethoxylated)trimethylolpropane triacrylate and tris(2-hydroxyethyl) isocyanurate triacrylate.

Monofunctional acrylates such as isobornylacrylate, benzylacrylate, phenylthioethylacrylate are also suitable.

These compounds can be used alone or in combination.

SUMMARY OF THE INVENTION

Thus, an object of the invention is to provide a photocurable adhesive composition which overcomes the drawbacks of the prior art curable adhesive compositions, in particular for use in a coating transfer process;

a further object of the invention is to provide a photocurable adhesive composition as above which not only results in a good adhesion of the coating or coating stack onto the substrate but also does not impair the optical and mechanical properties of the final product, such as haze, application stain and resistance to thermal cracking, in particular when tinted substrates such as tinted lens blanks or lenses are used.

These and other objects which will become apparent in the following description are reached according to the invention by providing a curable adhesive composition, preferably a photocurable adhesive composition, comprising based on the total weight of the polymerizable monomers and/or oligomers of the composition:

(A1) 20 to 80 wt % of at least one diacrylate monomer or oligomer thereof;

(A2) 80 to 20 wt % of at least one polyalkoxylated bisphenol dimethacrylate or oligomer thereof; and (B) 0 to 50 wt % of at least one copolymerizable monomer different from (A1) and (A2);

with the proviso that the composition is free from any thio(meth)acrylate (—SCOCR'=CH$_2$, with R'=H or CH$_3$) monomer or oligomer thereof.

In a preferred embodiment the curable, preferably photocurable, adhesive composition comprises:

(A1) 20 to 71 wt % of at least one diacrylate monomer or oligomer thereof; and (A2) 80 to 29 wt % of at least one aromatic dimethacrylate monomer or oligomer thereof;

Preferably the aromatic dimethacrylate monomer or oligomer thereof is at least one polyalkoxylated bisphenol dimethacrylate or oligomer thereof.

Preferably, dimethacrylate component (A2) has formula:

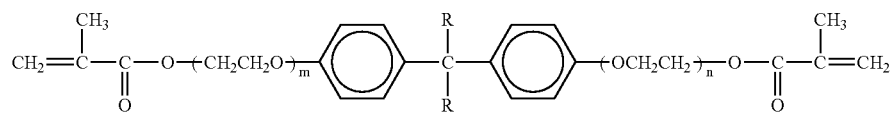

in wich R is H or a C$_1$-C$_4$ alkyl radical, preferably CH$_3$ and m+n>0, preferably m+n≧2, more preferably m+n≧4; and Preferably, component (A1) is a non aromatic diacrylate monomer or oligomer.

Preferably, component (A2) is a dimethacrylate monomer or oligomer of above formula in which m+n ranges from 2 to 10, better from 2 to 8, more preferably 3 to 5.

Preferably the composition of the invention comprises 28 to 71 wt %, more preferably 28 to 42 wt % of component (A1) and 72 to 29 wt %, more preferably 72 to 58 wt % of component (A2).

Preferably, component (B) represents 30 wt % or less, better less than 20 wt % and even better less than 10 wt %.

In the most preferred cases, the composition of the invention is free of component (B).

Generally, the curable adhesive composition does not contain a brominated monofunctional acrylate and preferably does not contain any brominated acrylate.

More preferably, the curable adhesive composition does not contain any monomer including a bromo atom.

In a preferred embodiment, the diacrylate monomers (A1) have a calculated solubility parameter ranging from 8 to 12, preferably 8.5 to 11.5 $(cal/cm^3)^{1/2}$.

Also, the preferred diacrylate monomers (A1) have a molecular weight less than 500, preferably $\leqq 350$.

For each component of the composition, the oligomer has preferably a molecular weight less than 10000.

The present invention also concerns a process or method for transferring a coating from a support onto a surface of a polymer material substrates, preferably a thermoplastic material substrate, comprising:

- providing a polymer material substrate, preferably a thermoplastic material substrate, having at least one main surface;
- providing a support having an internal surface bearing a coating and an external surface;
- depositing on said main surface of the substrate or on said coating a pre-measured amount of a curable adhesive composition;
- moving relatively to each other the substrate and the support to either bring the coating into contact with the curable adhesive composition or bring the curable adhesive composition into contact with the main surface of the substrate;
- applying a sufficient pressure onto the external surface of the support so that the thickness of a final adhesive layer, once the curable composition has cured, is less than 100 μm;
- curing the layer of adhesive composition; and
- withdrawing the support to recover a substrate with the coating adhered onto the main surface of the substrate, wherein the curable adhesive composition is a curable adhesive composition as defined above.

The present invention also concerns an overmolding process which comprises:

- providing a polymer material substrate, preferably a thermoplastic material substrate, having at least one main surface;
- providing a mold part having an internal surface and an external surface;
- depositing on said main surface of the substrate or on said internal surface of the mold part a pre-measured amount of a curable adhesive composition as disclosed above;
- moving relatively to each other the substrate and the mold part to either bring the internal surface of the mold part or the main surface of the substrate in contact with the curable adhesive composition;
- applying a sufficient pressure onto the external surface of the mold part to uniformly spread the curable adhesive composition and form a uniform layer, once cured, having a thickness of at least 200 μm;
- curing the layer of adhesive composition; and
- withdrawing the mold parts to recover the substrate overmolded with a cured layer of the curable adhesive composition.

The overmolded cured layer of adhesive composition has preferably a thickness of at least 500 μm.

By internal surface of the support or the mold part, it is meant the surface of the support or the mold part facing one main surface of the thermoplastic material substrate.

It is encompassed within the scope of the invention to use a support or mold part wherein the amount of curable adhesive composition has been predeposited. However, in the process of the invention, one prefers applying the adhesive composition just before moving the substrate and the mold towards each other.

The present invention further concerns a process for making laminated polymer articles, preferably thermoplastic articles, such as laminated ophthalmic lenses, which comprises depositing a pre-measured amount of a curable, preferably a photocurable, adhesive composition on a main surface of a first part made of polymer material, bringing into contact the deposited curable adhesive composition with a main surface of a second part made of a polymer material, preferably a thermoplastic material, pressing the first and second parts against each other to uniformly spread the curable adhesive composition to form a uniform thin layer and curing, preferably photocuring, the thin layer to obtain a laminated article, wherein the curable adhesive composition is as defined above.

The adhesive composition of the invention can be deposited on a naked substrate, i.e. a substrate free of any coating on its main surfaces, or on an already coated substrate. In particular, the adhesive composition of the invention is particularly suitable for the transfer of coatings on organic glass substrate in which a dye or pigment has been superficially diffused or which have been previously coated with a tintable material such as an acrylic material and in which a dye or pigment has been diffused (typically by dipping the coated substrate in a dying bath).

Preferably, the parts are ophthalmic lens elements and are made of polycarbonate.

By pre-measured amount, one means a sufficient amount of curable, preferably photocurable adhesive composition to obtain transfer and adhesion of the coating or overmolding of the substrate or adhesion of the two parts.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Figure 1A:
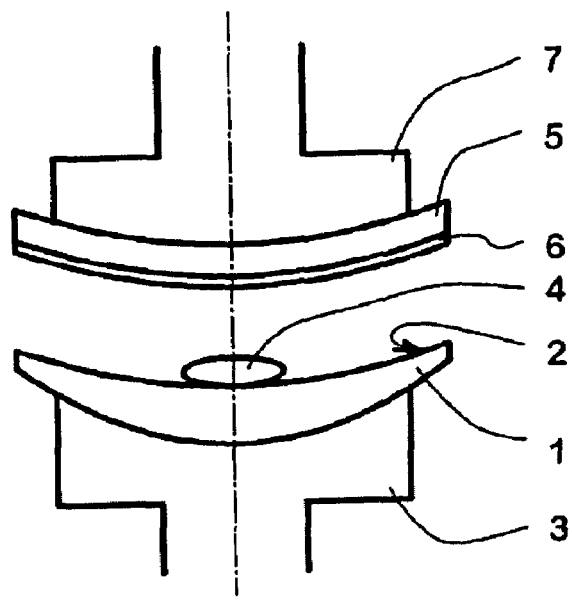
FIGS. 1A, 1B and 1C are schematic views of the main steps of a first embodiment of the process of the invention for transferring a coating onto an optical surface of a lens blank.

The first component (A1) of the curable, preferably photocurable, adhesive composition of the invention consists of at least one diacrylate monomer or oligomer thereof. Preferably, diacrylate monomers (A1) have a solubility parameter ranging from 8 to 12 $(cal/cm^3)^{1/2}$, more preferably from 8.5 to 11.5 $(cal/cm^3)^{1/2}$ and a molecular weight of less than 500, preferably of 350 or less and typically between 200 and 300, most preferably between 200 and 275.

The solubility parameters of the diacrylate monomers (A1) are calculated using the group distribution method, using in the calculation the group values as determined by Hoy (Hoy's group contribution values can be found in Band Up J, and E. H. Immerget, ed S. Polymer Handbook $3^{rd}$ ed. John Wiley and Sons, New York 1989) [pages 524-525).

Preferably, the diacrylate monomers (A1) are non aromatic acrylate monomers. Also preferably, the diacrylate monomers (A1) are low refractive index acrylate monomers.

By low refractive index acrylate monomers it is meant acrylate monomers which by homopolymerisation result in homopolymers having refractive indices, $n_D^{25}$, ranging from 1.47 to 1.53.

Among the preferred diacrylate monomers (A1) there may be cited:

|  | Calculated Solubility parameters $(cal/cm^3)^{1/2}$ | Molecular weight |
| --- | --- | --- |
| Diethyleneglycoldiacrylate | 9.44 | 214 |
| Triethyleneglycoldiacrylate | 9.40 | 258 |
| Tetraethyleneglycoldiacrylate | 9.46 | 302 |
| Neopentylglycoldiacrylate | 8.56 | 212 |
| 1,6-hexanedioldiacrylate | 8.84 | 226 |

Of course mixtures of diacrylate monomers may be used for component (A1).

The second component (A2) of the curable composition of the present invention consists of at least one aromatic dimethacrylate monomer or oligomer thereof, preferably having formula:

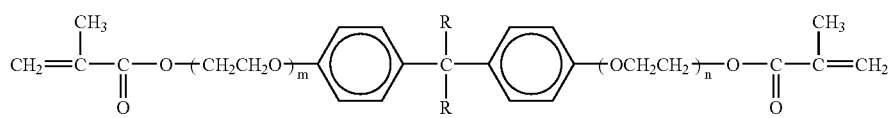

in which m+n>0, preferably m+n≧2, and more preferably m+n≧4. Generally, m+n ranges from 2 to 10, preferably from 2 to 8, more preferably from 3 to 5.

Among the preferred ethoxylated bisphenol-A dimethacrylate monomers, there may be cited ethoxylated (2) bisphenol-A dimethacrylate m+n=2, ethoxylated (4) bisphenol-A dimethacrylate (m+n=4), ethoxylated (8) bisphenol-A dimethacrylate (m+n=8) and ethoxylated (10) bisphenol-A dimethacrylate (m+n=10).

Of course, mixtures of aromatic dimethacrylate monomers can be used for component (A2).

Optional component (B) may be any copolymerizable monomer other than components (A1) and (A2) with the exclusion of any thio(meth)acrylate monomer, i.e. monomers comprising at least one —SCOCR'=CH$_2$ (R'=H or CH$_3$) functionnality.

Among the preferred component (B) there may be cited mono(meth)acrylate monomers and poly(meth)acrylate monomers other than the monomers (A1) and (A2) such as tetrahydrofurfurylacrylate and poly(alkylene glycol) mono acrylate, olefinic compounds, in particular aromatic olefinic compounds such as divinylbenzene or styrene.

Preferably, the composition of the present invention does not comprise component (B).

The curable compositions of the invention can be thermally curable compositions and/or photocurable compositions, but are preferably photocurable compositions.

Typically, the photocurable compositions of the present invention also comprise at least one photopolymerization initiator.

As the photopolymerization initiator, any widely known compound can be used without limitation that is added for photopolymerizing the polymerizable monomers and/or oligomers. Among the photopolymerization initiators that can be suitably used in the present invention, there may be cited benzophenone compounds, acetophenone compounds, α-dicarbonyl compounds, acylphosphine oxide compounds, bisacylphosphine oxide compounds and mixtures thereof.

More specifically speaking, photoinitiator compounds can be represented by the following formula:

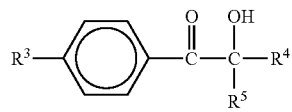

wherein $R^3$ is an alkyl group or a hydrogen atom and $R^4$ and $R^5$ are alkyl groups which together may form a cyclohexane ring,

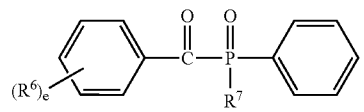

wherein $R^6$ is the same or different and is a methyl group, a methoxy group or a chlorine atom, e is 2 or 3, and $R^7$ is a phenyl group or methoxy group,

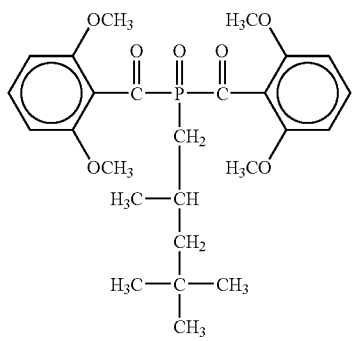

Examples of photopolymerization initiators than can be preferably used in the present invention are as described below:

Acetophenone Polymerization Initiators:
1) 1-Phenyl-2-hydroxy-2-methylpropane-1-one,
2) 1-Hydroxycyclohexylphenyl ketone, and
3) 1-(4-Isopropylphenyl)-2-hydroxy-2-methylpropane-1-one.

α-Dicarbonyl Compounds:
1) 1,2-Diphenylethanedione, and
2) Methylphenylglyoxylate.

Acylphosphine Oxide Photopolymerization Initiators:
1) 2,6-Dimethylbenzoyidiphenylphosphine oxide,
2) 2,4,6-Trimethylbenzoyldiphenylphosphine oxide,
3) Methyl 2,4,6-trimethylbenzoyldiphenylphosphinate ester,
4) 2,6-Dichlorobenzoyldiphenylphosphine oxide, and
5) 2,6-Dimethoxybenzoyidiphenylphosphine oxide.

Bisacylphosphine Oxide Photopolymerization Initiators:
1) Bis(2,6-dimethoxybenzoyl)-2,4,4-trimethylpentylphosphine oxide.

These photopolymerization initiators can be used in a single kind or in a combination of two or more kinds.

Among the preferred photo-initiators are the following photo-initiators:

Irgacure® 500
a 1/1 mixture of benzophenone and 1-hydroxycyclohexylphenyl.
Irgacure® 184

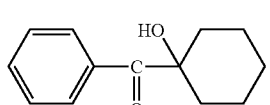

Irgacure® 819

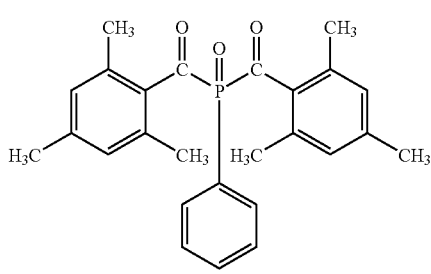

Irgacure® 1850

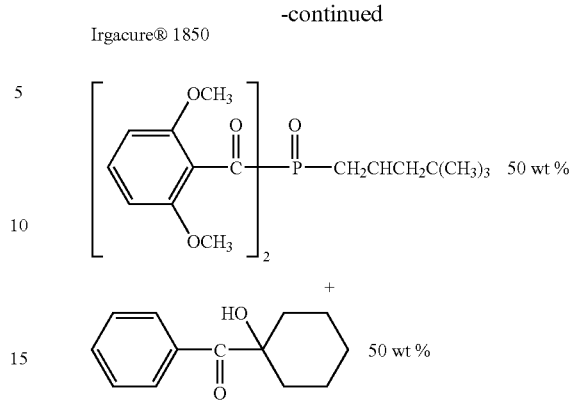

In the present invention, the photoinitiator is added in usual amounts, namely from 0.1 to 5 parts by weight, preferably 1 to 5 parts by weight based on 100 parts by weight of the photopolymerizable monomers and/or oligomers of the composition.

The preferred photocurable adhesive compositions of the invention have, after curing, a high refractive index $n_D^{25}$, ranging from 1.53 to 1.65, preferably 1.53 to 1.57, typically 1.54 to 1.55 and a glass transition temperature Tg of preferably at least 50° C., more preferably at least 60° C. and better at least 70° C., and even better at least 80° C.

The curable, preferably photocurable, adhesive composition is appropriate for use in coating transfer processes, lamination and over molding processes, using naked or coated substrate such as organic glass substrates, in particular thermoplastic substrates and preferably PC substrates. The composition of the invention is particularly suitable for use with tinted substrates in order to avoid application stain. It is particularly useful for making ophthalmic lenses and other optical articles.

Use of the curable composition of the invention will now be described as applied to a coating transfer process for making coated substrates such as ophthalmic lenses. It shall be understood that the photocurable adhesive composition of the invention may be used in any coating transfer method and not solely in the process described below.

The substrate is preferably a lens blank. Preferably, the main surface of the blank onto which the coating is transferred, is a geometrically defined surface.

By geometrically defined surface of the lens blank or of a mold part, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ μm to 1 μm, preferably from $10^{-3}$ to 0.5 μm and most preferably from $10^{-3}$ to 0.1 μm.

Sq: Quadratic mean of the deviations from the mean $$Sq = \sqrt{\frac{1}{NM} \sum_{x=1}^{N} \sum_{y=1}^{M} Zx, y^2}$$

Computes the efficient value for the amplitudes of the surfaces (RMS). This parameter is included in the EUR 15178 EN report (Commission of the European Communities) Stout et al. 1993: The development of methods for the characterization of roughness in three dimensions.

The roughness (Sq) was measured by P-10 Long Scan of KLA-Tencor.

The measurement condition was under 2 μm tip 1 mg force 10 scans 500 μm long 2000 data points.

By optical surface, there is meant a surface of the lens blank or of a mold part that has been ground, fined and polished or molded to required geometry and smoothness.

The substrate may be made of any transparent material typically used for making optical articles, in particular ophthalmic lenses, such as a mineral or organic glass, preferably an organic glass.

Preferred substrates are made of polymer materials and more preferably of thermoplastic materials.

Among the organic glass substrates suitable for the present invention, there may be cited substrates obtained by polymerization of alkyl(meth)acrylates, in particular $C_1$-$C_4$ alkyl (meth)acrylates such as methyl(meth)acrylate and ethyl (meth)acrylate, allylic compounds such as allyl carbonates of, linear or branched, aliphatic or aromatic polyols, thio(meth)acrylates, thiourethans, aromatic polyalkoxylated (meth)acrylates such as polyethoxylated aromatic dimethacrylates, in particular polyethoxylated bisphenolates dimethacrylates and polycarbonates (PC).

Among the preferred substrates, there may be cited the substrates resulting from the polymerization of polyolalkylcarbonates, in particular polyolallylcarbonates, such as ethyleneglycol bisallylcarbonate, diethyleneglycol bis(allylcarbonate), diethyleneglycol bis(2-methylcarbonate), etyleneglycol bis(2-chloroallylcarbonate), triethyleneglycol bis(allylcarbonate), 1,3-propanediol bis(allylcarbonate), propyleneglycol bis(2-ethylallylcarbonate), 1,3-butanediol bis(allylcarbonate), 1,4-butanediol bis(2-bromo allylcarbonate), dipropyleneglycol bis(allylcarbonate), trimethyleneglycol bis(2-ethylallylcarbonate), pentamethyleneglycol bis(allylcarbonate), dipropylene bisphenol-A bis(allylcarbonate) and polycarbonates, in particular bisphenol-A polycarbonates.

In a preferred embodiment, the substrate is a tinted substrate, i.e. a substrate in which at least one dye or pigment has been superficially diffused in the substrate itself or a substrate at least a main surface of which has been coated with a layer of a tintable material such as an acrylic material and in which a dye or pigment has been diffused (generally through diffusing in a dying bath). Such a tinting process is known in the art and is disclosed in particular in International Patent Application n° WO 03/040461. Typically, the dying bath comprises water, at least one dye or pigment, a carrier and optionally a surfactant.

The dying process can also be performed on a substrate which has been pretreated by UV irradiation as disclosed in French Patent Application n° 9904409.

Briefly stated, this dying process comprises irradiating the substrate, in particular a PC substrate, with UV irradiation to realize within the substrate a superficially photodegraded layer of at least 1 μm thickness and contacting the photodegraded layer with a coloring agent to diffuse the coloring agent to a depth of at least 1 μm within the photodegraded layer.

The UV light has a wavelength spectrum during irradiation such that at least 50% of the irradiation energy is provided by irradiation of wavelength ≦320 mm. Preferably, the irradiation energy of UV light ≦320 mm is 2.4 to 48 J/cm², more preferably 10 to 30 J/cm² and the irradiation energy of UV light >320 mm is 0.9 J/cm² to 15 J/cm², preferably 2 J/cm² to 8 J/cm².

Irradiation typically lasts from 0.1 to 10 seconds, preferably from 0.4 to 4 seconds.

An important feature of the process of the present invention is that the transfer of the coating onto the geometrically defined surface of the lens blank is performed without any substantial compression of the blank and thus without any risk of deformation of the blank geometry and in particular of the geometrically defined surfaces thereof.

Nevertheless, the pressure exerted on the external surface of the support is preferably substantially maintained at least up to the gelling of the adhesive composition. Maintaining the pressure can be effected through the use of an inflatable membrane placed on the external surface of the support.

Preferably, the applied pressure ranges from 5 to 50 Psi (0.35 to 3.5 kgf/cm²), and more specifically 0.3 to 3 kgf/cm². Most preferred range is 5 to 20 Psi (0.35 to 1.40 kgf/cm²).

Using the above described process, coatings may be transferred successively or simultaneously to both front and rear geometrically defined surfaces of the lens blank. The transfer of the coatings may also be performed only to one side of the lens blank, preferably to the back side (or rear side).

The coating support or carrier may simply be a thin supporting film made of an appropriate material such as a plastic material, for example a polycarbonate film. The coating support is preferably a mold part made of any appropriate material, preferably made of a plastic material especially a thermoplastic material and in particular of polycarbonate.

The working surface of the mold part may have a relief organized according to a pattern, in other words, may be microstructured and may confer to the final lens an optical surface having the properties imparted by the microstructure (for example antireflective properties).

Different techniques for obtaining a microstructured mold part are disclosed in WO99/29494.

The mold part or carrier may be obtained by using known processes such as surfacing, thermoforming, vacuum thermoforming, thermoforming/compression, injection molding, injection/compression molding.

Injection molding comprises injecting a thermoplastic material in molten state in a mold cavity and then solidifying the injected thermoplastic material by cooling.

The support, typically a mold part, may be rigid or flexible, but is preferably flexible. Using rigid mold parts necessitates to have a large number of mold parts each comprising a geometrically defined surface whose geometry is adapted to a specific geometry of the geometrically defined surface of a lens blank. In order to avoid the necessity of having such a huge number of different mold parts, the mold part is preferably a flexible mold part, in particular a flexible mold part made of a plastic material such as polycarbonate. When using this flexible mold part it is only necessary to provide the mold part with a surface the geometry of which conforms to the general shape of the optical surface of the lens blanks onto which the coating is to be transferred, either a concave or convex shape, but it is not necessary that this surface strictly corresponds to the geometry of the lens blank surface to be coated. Thus, the same mold part can be used for transferring coatings onto lens blanks having surfaces of different specific geometries. Generally, the flexible mold part has two parallel main surfaces and consequently has an even thickness.

The coating bearing surface of the flexible mold is preferably spherical.

Flexible mold parts would typically have a thickness of 0.2 to 5 mm, preferably of 0.3 to 5 mm. More preferably, the flexible mold part is made of polycarbonate, and in this case the thickness is from 0.5 to 1 mm.

It has been found that the best embodiments of the transfer process are achieved if specific requirements regarding the base curvatures of the mold part and lens blank are fulfilled.

In this patent application, when one refers to the base curvature of the mold part, one means the base curvature of the working surface of the mold part, that is to say the surface which bears the coatings to be transferred to the lens or lens blank.

In the same way, base curvature of the lens or lens blank means the base curvature of the surface to which the coatings are going to be transferred from the above cited mold part.

In this application, the base curvature has the following definition:

For a spheric surface, having a radius of curvature R,

Base curvature (or base)=$530/R$ (R in mm);

such kind of definition is quite classical in the art

For a toric surface, there are two radii of curvature and one calculates, according to the above formula, two base curvatures BR, Br with BR<Br.

For a coating transfer to a spherical back side of a lens or lens blank, in order to avoid distortions, in particular when using a flexible mold part, the base curvature (BC) of the flexible mold part (front side) must be slightly higher than the base curvature (BL) of the geometrically defined surface of the lens or the lens blank on which the coating is to be transferred. However, BC shall not be too high in order to avoid cracking of the coating during the transfer process or an optical power outside tolerance of the Optical Laboratory Standard Z80.1 after the transfer.

Typically, for a spheric lens or lens blank, base curvature BL of the lens or lens blank and base curvature BC of the flexible mold part shall satisfy the relationship:

0<$BC-BL$<1.5

Preferably 0.2<$BC-BL$<1

For a coating transfer to a toric back side of a lens or a lens blank (cylindric lens or lens blank), having two principal meridians, of radii R and r with R>r, it is possible to calculate two base curvatures BLR and BLr corresponding respectively to radii R and r defining the toric surface.

Base curvatures of the lens BLR and BLr and the base curvature of the flexible mold part shall satisfy the following relationship:

BLR<BLr a) if BLr−BLR≦3.5
  0<BC−BLR<3}
  |BC−BLr|<1}
preferably
  0.2<BC−BLR<2.5}
  |BC−BLr|<0.5}
b) if BLr−BLR>3.5
  BLR<BC<BLr When using a rigid mould part, preferably the base curvature of the mould part (BC) is the same as the base curvature of the lens or lens blank (BL).

Preferably, when moving relatively to each other the mold part and the blank, the contact between coating(s) and curable adhesive composition or between adhesive composition and lens blank geometrically defined surface occurs respectively in the center area of the coated mold part or in the center area of the lens blank geometrically defined surface.

In particular in the case of a flexible mold part, the convex front face of the mold part may have a shorter radius of curvature than the concave surface of the blank to be coated. Thus, pressure is applied at the center and the mold part is then deformed to conform to the blank surface. The glue layer is formed starting from the center of the blank, which avoids entrapping air bubbles within the final cured adhesive composition layer. The same will be true using the concave surface of a mold part of longer radius of curvature than a convex blank surface to be coated.

As previously mentioned, transfer from a flexible mold part may be effected using an inflatable membrane.

The inflatable membrane can be made of any elastomeric material which can be sufficiently deformed by pressurization with appropriate fluid for urging the flexible mold part against the lens or lens blank in conformity with the surface geometry of the lens or the lens blank.

The inflatable membrane can be made of any appropriate elastomeric material. Typically, the inflatable membrane has a thickness ranging from 0.50 mm to 5.0 mm and an elongation of 100 to 800%, and a durometer 10 to 100 Shore A.

For UV curing, then a transparent material shall be selected, for example a transparent silicone rubber or other transparent rubbers or latexes: the UV light is preferably irradiated from the mold side.

The pressure applied to the mold part by the inflatable membrane will preferably range from 30 kPa to 150 kPa and will depend on the lens or lens blank and flexible mold part sizes and curvatures. Of course, the pressure needs to be maintained onto the flexible mold part and the lens or lens blank until the glue or adhesive is sufficiently cured so that enough adhesion of the coating to the lens or lens blank is obtained.

The lens blank can be a lens having one or both of its faces surfaced or casted to the required geometry. (A lens having only one of its faces surfaced or casted to the required geometry is called a semi-finished lens).

Preferably, the lens blank has a first face conferring progressive power and a second face conferring non-progressive power, but of spherical or torical shape onto which coating transfer according to the invention process is preferably performed. Preferably, the progressive face is the front face of the blank.

The lens blank can also be a semi-finished lens wherein one face of the lens, preferably the front face of the lens has previously been treated with an appropriate coating (anti-reflective, hard coat, etc . . . ) and the remaining face, preferably the rear face, of the lens is coated using the transfer process of the invention. The lens blank can be a polarized lens.

Although the following description makes reference to the use of a preferred flexible mold part, it shall be understood that the described process can also be implemented using rigid mold parts.

Figure 1B:
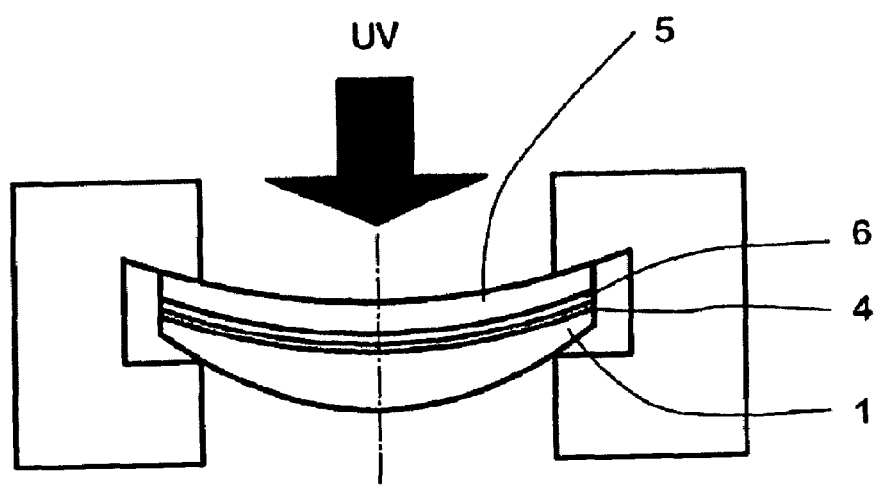
Figure 1C:
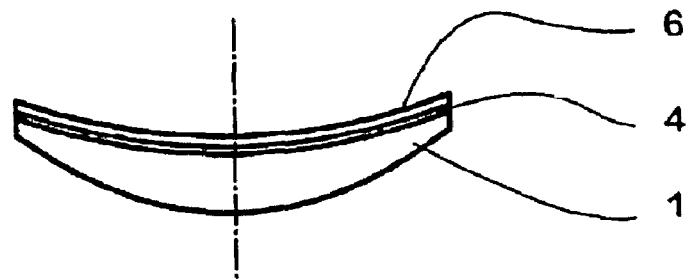

Referring now to the drawings and in particular to FIGS. 1A to 1C, a lens blank 1 having a concave surface 2 is placed on a supporting element 3 with its concave surface 2 facing upwardly. A pre-measured drop of a UV curable adhesive composition 4 according to the invention is then deposited onto the surface 2 of the lens blank 1. A flexible mould part 5 having a convex optical surface, which has been previously coated with a prescribed coating 6, is placed onto a supporting element 7 with its surface bearing the optical coating facing downwardly.

Deposition of coating 6 on the surface of the flexible mold part 5 can be done through any usual deposition process employed in the optical field, such as vacuum deposition, spin coating, brush coating, dip coating etc. . . . Of course, the deposition process will depend on the nature of the coating layer or layers deposited on the surface of the flexible mold part 5.

Thereafter the supporting elements 3, 7 are moved relatively to each other to bring into contact coating 6 and UV curable adhesive composition drop 4 and a pressure is exerted to the external surface of the mold part opposite to the coating in such a manner that the UV curable adhesive composition drop will spread on the surface 2 of the lens blank 1 and on the coating 6. However, the exerted pressure shall only be sufficient for spreading the drop of adhesive composition in order to obtain the required thickness for the final cured film (generally 100 μm or less) but insufficient to impart any deformation to the lens blank 1.

As shown in FIG. 1B, the assembly formed by the lens blank 1, the adhesive composition film 4, the coating 6 and the mold part 5 is then placed into a device for UV curing the adhesive composition film 4. After UV curing of the film 4, the mold part 5 is withdrawn and a blank 1 having a coating 6 adhered onto its concave surface 2 is recovered as shown in FIG. 1C.

Figure 2A:
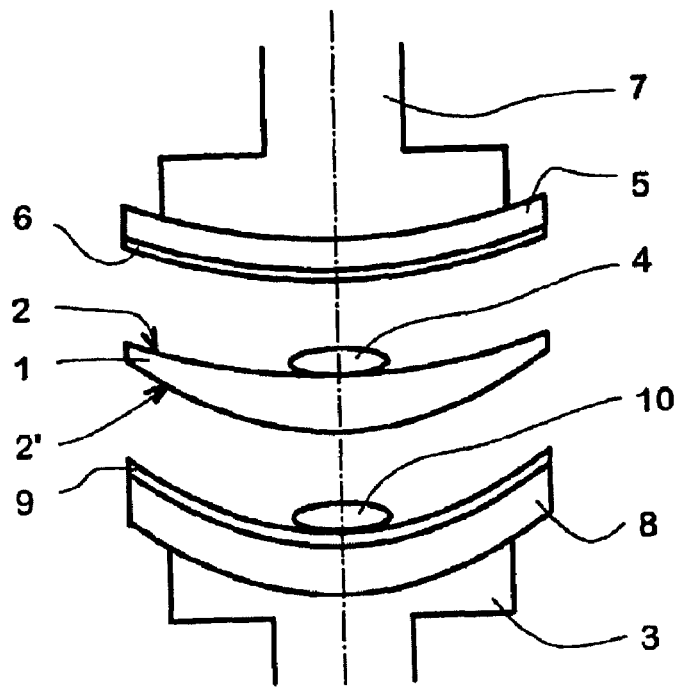
FIGS. 2A, 2B and 2C are schematic views of the main steps of a second embodiment of the process of the invention wherein coatings are simultaneously transferred to both optical surfaces of a lens blank.
Figure 2B:
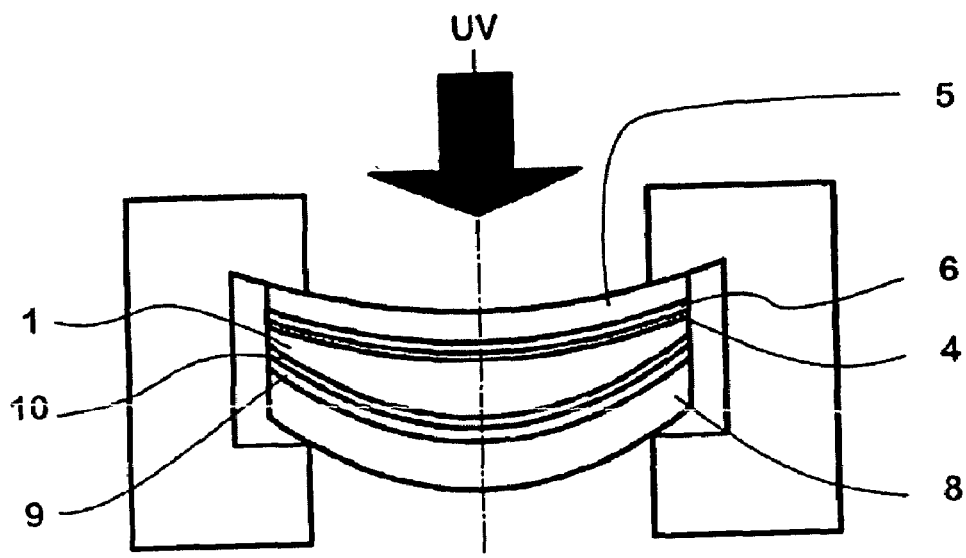
Figure 2C:
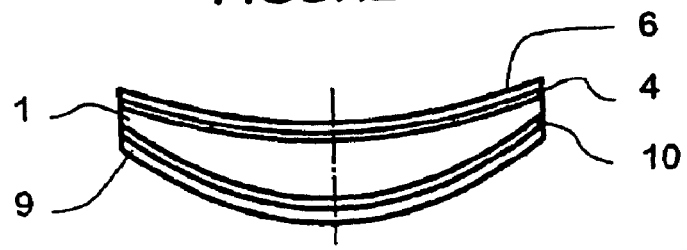

Referring now to FIGS. 2A to 2C, there is shown a similar process as described in connection with FIGS. 1A to 1B but in which both surfaces of lens blank 1 are coated with a coating by the transfer method of the invention.

As shown in FIG. 2A, a flexible mould part 8, for example a mould part made of polycarbonate having a thickness of 1 mm, whose concave surface has been previously coated with an optical coating 9 is placed onto a supporting element 3. A pre-measured drop 10 of a UV curable adhesive composition is then deposited onto coating 9. A lens blank 1 is then placed on mold part 8 with its convex surface 2' in contact with glue drop 10. A pre-measured UV curable adhesive composition drop is then deposited on concave surface 2 of lens blank 1. A flexible mold part 5, for example a polycarbonate mold part of 1 mm thickness, whose convex surface has been previously coated with an optical coating 6 is placed on a supporting element 7. Supporting elements 3, 7 are then moved relatively to each other to bring coating 6 into contact with adhesive composition drop 4 and a pressure is exerted on at least the external surface of one of the mold part to spread the adhesive composition drops 4 and 10 to form films. As indicated previously, the pressure exerted must only be sufficient to spread the adhesive composition drops and form films of required thickness after curing but insufficient to create any deformation in the lens blank 1.

Thereafter, the assembly formed by the mold parts, optical coatings, adhesive composition films and lens blank is placed into a UV curing device where the adhesive composition films 4, 10 are UV cured.

After completion of curing of the adhesive composition films, mold parts 5 and 8 are withdrawn and a finished lens having optical coatings 5, 6 adhered to both surfaces of the lens blank 1 is recovered, as shown in FIG. 2C.

Figure 3A:
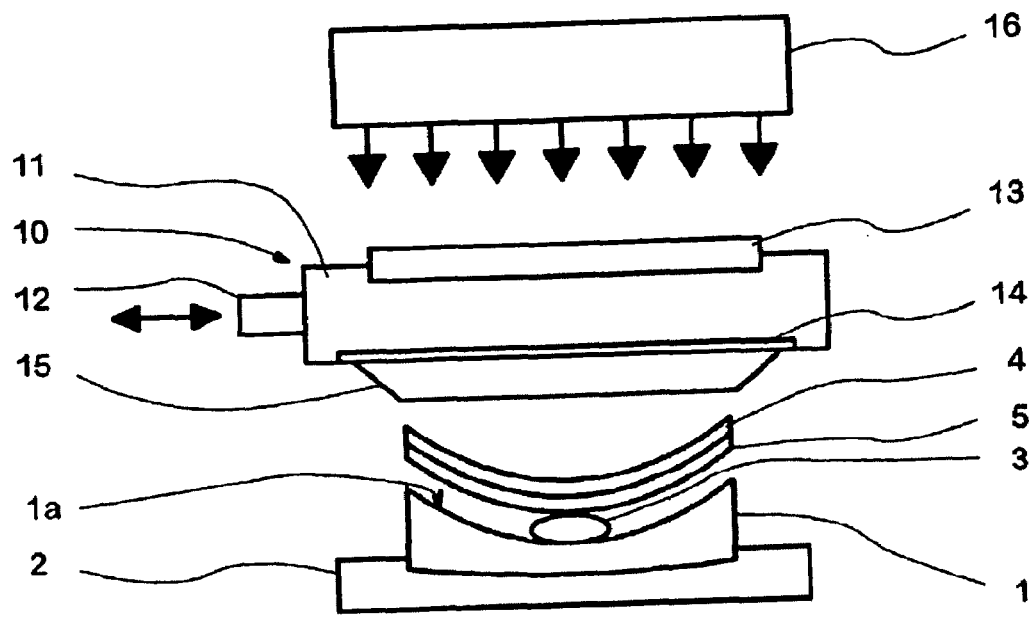
FIGS. 3A and 3B are schematic views of the main steps of a third embodiment of the process of the invention using an inflatable membrane apparatus.
Figure 3B:
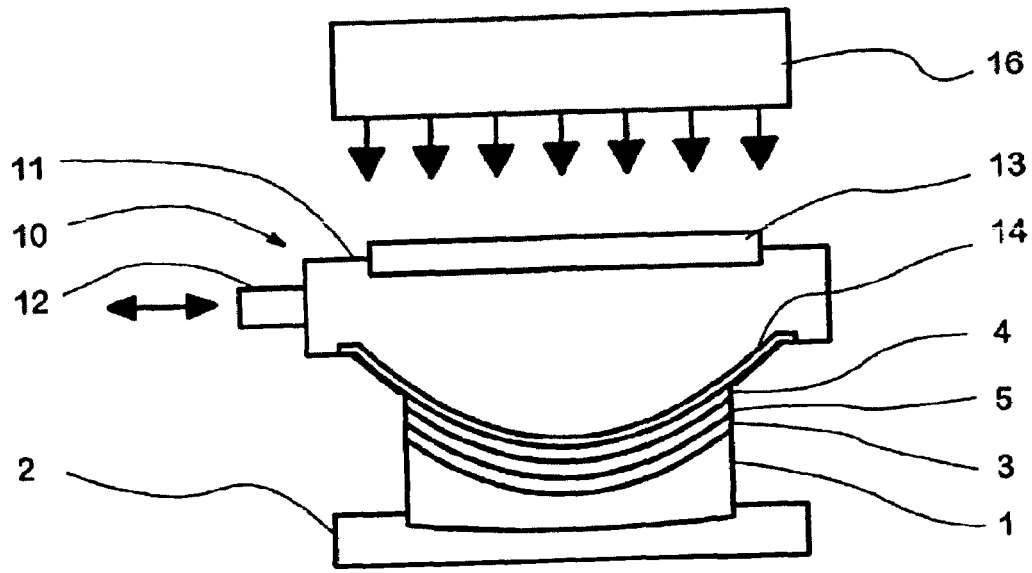

FIGS. 3A and 3B are schematic views of a third embodiment of the process of the invention in which the transfer of the coating is performed using a flexible mold part or carrier which is urged against the lens blank surface using an inflatable membrane.

FIG. 3A shows the lens blank, flexible carrier and inflatable membrane before pressurization and inflation of the membrane, whereas FIG. 3B shows the same after pressurization and inflatation of the membrane.

Referring to FIG. 3A, a lens blank 1, is placed in a lens blank support with its geometrically defined surface 1a facing outwardly.

A drop of photocurable adhesive composition 3 is deposited at the center of the geometrically defined surface 1a of the lens blank 1.

A thin flexible carrier 4, for example a spheric carrier, having a transferable coating 5 deposited on one of its faces, is placed on the adhesive composition drop 3 so that the transferable coating 5 is in contact with the adhesive drop 3. The base curvature of the flexible carrier 4 is slightly higher than the base curvature of the geometrically defined surface 1a of a lens blank 1.

The whole assembly is place in front of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid from the accumulator. the upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 3A, the apparatus 10 further comprises a guiding means 15 for laterally guiding the inflatable membrane 14 during inflatation thereof. More specifically, this guiding means comprises a trunconical part or funnel 15 projecting outwardly form the lower face of the accumulator 10 and whose greater base is obturated by the inflatable membrane and whose smaller base is a circular opening having a diameter at least equal to the base diameter of the flexible carrier 4 but preferably slightly larger (up to 5 mm larger . . . ).

Typically, the funnel height will range from 10 to 50 mm, preferably 10 to 25 mm, and will have a taper of 10 to 90°, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the adhesive composition drop 3 and the flexible carrier 4 is placed so that the rim of the flexible carrier 4 be within the plan of the rim of the smaller base opening of funnel 15 or separated therefrom by a distance up to 50 mm, preferably up to 20 mm.

As shown in FIG. 3B, a pressurized fluid, such as pressurized air, is introduced into the accumulator 11 from an external source (not represented) through entrance 12. The pressure increase within the accumulator, inflates the inflatable membrane 14 uniformly urges the flexible carrier against the lens blank 1, while uniformly spreading the adhesive 3.

The adhesive composition is then UV-cured.

After completion of the curing step, the lens blank 1 is disassembled from the holder 2 and the flexible carrier 4 is removed to recover a lens blank 1 whose geometrically defined surface 1a bears the transferred coating 5.

Using the funnel type of apparatus just described, a good coating transfer is obtained, with good optical quality meeting the America Optical laboratory Standard (ANSI Z80.1-1987) as far as the power, cylinder, prism and distortion are concerned.

The membrane guiding means (funnel) is very important to let the membrane expand in good shape and direction for applying an even pressure on the flexible carrier through the lens blank without any extra pressure on the carrier and lens blank edges.

As previously mentioned, the thickness of the final adhesive composition layer after curing is less than 100 μm preferably less than 80 μm, most preferably less than 50 μm and usually 1 to 30 μm.

The substrates which are highly preferred for the process of the invention are made of any thermoplastic material, in particular, suitable for making optical lenses such as polycarbonate.

However, even if they are not preferred, substrates made of thermosetting (cross linked) materials such as diethyleneglycol bis allylcarbonate polymer (CR39®PPG), polyurethane, polythiourethane, episulfide high index material can be used.

The substrate may optionally contain photochromic compounds.

Preferably, the substrate has a very high refractive index, i.e. a refractive index, $n_D^{25}$, of 1.56 or more, typically from 1.56 to 1.74 and preferably from 1.57 to 1.59.

A preferred substrate material is polycarbonate (PC).

The transferred coating may comprise any coating layer or stack of coating layers classically used in the optical field, such as a hydrophobic top coat, an anti-reflective coating layer, an anti-abrasion coating layer, an impact resistant coating layer, a polarized coating layer, a photochromic coating layer, an optical-electronical coating, an electric-photochromic coating, a dying coating layer, a printed layer such as a logo or a stack of two or more of these coating layers.

According to a preferred embodiment of the invention, it is transferred to the geometrically defined surface of the lens blank a stack comprising:
  optionally, a hydrophobic top coat;
  an antireflective stack, generally comprising inorganic material such as metal oxide or silica;
  an anti abrasion (hard) coat, preferably comprising a hydrolyzate of one or more epoxysilane (s) and optionally one ore more inorganic filler(s) such as colloidal silica;
  optionally, an impact resistant primer, preferably a polyurethane latex or an acrylic latex;
  each of the layers of the stack being deposited onto the support in the above recited order.

The method of the invention is particularly interesting for transferring the whole stack comprising "top coat, antireflective coat, hard coat and primer coat".

Generally the thickness of the antireflective coat or stack ranges from 80 nm to 800 nm and preferably 100 nm to 500 nm.

The thickness of the hard coat preferably ranges from 1 to 10 micrometers, preferably from 2 to 6 micrometers. The thickness of the primer coat preferably ranges from 0.5 to 3 micrometers.

Typically, the total thickness of the coating to be transferred is 1 to 500 μm, but is preferably less than 50 μm, more preferably less than 20 micrometers, or even better 10 μm or less.

The following examples illustrate the present invention.

Multilayer Coating

In all the examples, the transferred multilayer coating comprises hydrophobic top coat/anti-reflective coating/hard coating/primer coating (HMC).

The percentages of monomers are given in the example for the whole content of monomers compositions (monomer+initiator).

One can easily calculate the corresponding percentages of monomers based on the total weight of polymerizable monomers of the composition.

STEP 1: Protecting and Releasing Coating

The composition of the protecting and releasing coating was as follows:

| Component | Parts by weight |
| --- | --- |
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

STEP 2: Hydrophobic Top Coat and Anti-Reflective (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the mold:
1. The carrier having the protective coating already applied on the surface, is loaded into a standard box coater and the chamber is pumped to a high vacuum level.
2. Hydrophobic coating (Chemical=Shin Etsu KP801M) is deposited onto the surface of the carrier using a thermal evaporation technique, to a thickness in the range of 2-15 nm.
3. The dielectric multilayer AR coating, consisting of a stack of sublayers of high and low index materials is then deposited, in reverse of the normal order. Details of this deposition are as such:

The optical thicknesses of the alternating low and high index layers are presented in the table:

| | |
| --- | --- |
| $SiO_2$ | 103-162 nm |
| $ZrO_2$ | 124-190 nm |
| $SiO_2$ | 19-37 nm |
| $ZrO_2$ | 37-74 nm |

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a lacquer hard-coating which will be deposited on the coated mold at a later time.

STEP 3: Hard Coat (HC) & Latex Primer Coating

The composition of the hard coating is as follows:

| Component | Parts by weight |
| --- | --- |
| Glymo | 21.42 |
| 0.1 N HCl | 4.89 |
| Colloidal silica | 30.50 |
| Methanol | 29.90 |

-continued

| Component | Parts by weight |
|---|---|
| Diacetone alcohol | 3.24 |
| Aluminium acetylacetonate | 0.45 |
| Coupling agent | 9.00 |
| Surfactant FC-430 (3 M company) | 0.60 |

The composition of the primer is as follows:

| Component | Parts by weight |
|---|---|
| Polyurethane latex W-234 | 35.0 |
| Deionized water | 50.0 |
| 2-Butoxy ethanol | 15.0 |
| Coupling agent | 5.00 |

The PC carrier after deposition of protecting coating and AR coating in Steps 1 and 2 is then spin coated by HC solution at 600 rpm/1200 rpm, and precured 10 minutes at 80° C., and again spin coated by latex primer solution at the same speed and postcured for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltriméthoxysilane | 10 |
| 0.1 N HCl | 0.5 |
| Aluminum acetylacetonate | 0.5 |
| Diacetone alcohol | 1.0 |

Testing and Inspection Procedures

Adhesion is measured using the cross-hatch adhesion test according to ISTM 02010, using 3M SCOTCH® n° 600 transparent tape.

25 squares are formed.

Adhesion is rated as follows:

| Adhesion score | Squares removed | Area % left intact |
|---|---|---|
| 0 | 0 | 100 |
| 1 | <1 | 96 |
| 2 | 1 to 4 | 96-84 |
| 3 | >4 to 9 | 83-64 |
| 4 | >9 to 16 | 63-36 |
| 5 | >16 | <36 |

Resistance to thermal cracking is determined by the measure of the critical temperature (Tc) according to ISTM method n° 02032.

The critical temperature Tc of an anti-reflective treated lens is that temperature at which crazing (fine cracking) of the anti-reflective treatment is first noted by visual inspection. Lenses are placed in a temperature controlled oven (50° C. to start) for one hour, then removed and quickly examined for crazing. If no crazing is noted, the lenses are then placed in an oven, 10° C. higher in temperature than the previous oven. The process is repeated until crazing is noted, or the lens survives 100° C.

If crazing is found on a lens immediately after removal from the oven, but is not visible 24 hours later (kept at room temperature), the reported critical temperature is modified with a "+" suffix.

A coated lens is considered as resistant to thermal cracking if Tc>60° C., preferably Tc≧65° C. However, a coated lens having a Tc≧50° C. is considered acceptable.

Haze and application stain levels were visually determined using a standard R17 application lamp with Vita-Life 15 Watt fluorescent bulb and then a mini-spot 41601 lamp manufactured by OSRAM.

The lenses were viewed with the incident light approximately normal to the lens surface. Haze is defined as a general cloudiness or diffusion of the light over a large area of the lens. The inspection is made visually.

The mini-spot lamp is more accurate than the lamp with the Vita-Life bulb.

Results are rated as follows:

| | |
|---|---|
| 0 | none |
| 1 | light |
| 2 | medium |
| 3 | intense |

If Haze and Application stain reach each a value of 2, the lens is not suitable.

If haze or Application stain reaches a value of 3, the lens is not suitable.

In some cases, haze has also been determined using Hazeguard® apparatus.

EXAMPLES 1 TO 7 AND COMPARATIVE EXAMPLES C1 AND C2

Clear (uncolored) PC lenses (5.0 back curve, −2.00 dioptries) are washed with soap and water, and rinsed with deionized water prior to drying with compressed air. Then, they are blown with anti-static air and placed in the lens holder of an inflatable membrane apparatus. Drops of adhesive composition (previously filtered through a 0.45 µm syringe filter) are applied on the back side of the lenses: one drop in the center, and 4 drops equally distant from the first drop, on the corners of a 1.6 cm² square.

A HMC coating as previously disclosed is provided on a 6.1 front curve of a surfaced PC carrier (examples 1 to 3 and C1) or a thermoformed carrier 5.5 curve and 0.47 mm center thickness (examples 4 to 6 and C2) and the HMC coating is transferred onto the back surfaces of the lenses using the BST process of the present invention. The inflatable membrane apparatus is a manual apparatus or an automated apparatus and transfer parameters are as follows:

| Manual apparatus | |
|---|---|
| Distance between stage and membrane ring: | 31 mm |
| Membrane pressure (pressure applied by the membrane on the mold): | 12 psi (0.827 bar) |
| UV irradiation: | UV lamp Dymax 5000-EC flood UV light with D-bulb part n°38560, intensity 135 mW/cm² |
| Exposure (curing) time: | 30 seconds |
| Total BST process time: | 65 seconds |

-continued

| Automated apparatus | |
|---|---|
| Distance between stage and membrane ring: | 27.5 mm |
| Membrane pressure: | 12 psi (0.827 bar) |
| UV irradiation: | UV lamp Xenon (890-1886)B 4.2" spiral lamp (ozone free) pulsed UV (100 PPS), intensity 1188 mW/cm$^2$ |
| Inflation time: | 21-23 seconds |
| Deflation time: | 3 seconds |
| Exposure (curing) time: | 25 seconds |
| Total BST process time: | 120 seconds |

After BST process, the lens-carrier assembly is edged on a slow cycle using a Horizon 2 edge (air pressure 10-12 Psi (0.689-0.827 bar)). Finally, the carriers are blown apart from the lenses using compressed air.

Manual apparatus is used for examples 1 to 3 and C1 and automated apparatus is used for examples 4 to 7 and C2.

These examples show that for surfaced carriers the binary compositions of the invention are fully satisfactory for use in BST process and that compositions containing more than 80 wt % of component (A1) are not satisfactory regarding application stain and haze and compositions containing less than 20 wt % of (A1) are not satisfactory regarding adhesion.

EXAMPLES 8 TO 13 AND COMPARATIVE EXAMPLE C3

These examples are aimed to show the unique advantage of the adhesive compositions of the invention regarding application stain when used with tinted lenses.

PC lenses as in examples 1 to 7 are tinted according to the process disclosed in WO 03/040461. In examples 8 to 10 the lenses are blue tinted and in examples 11 to 13 the lenses are green tinted.

A surface of the tinted PC lenses is contacted for 15 seconds with one drop of an adhesive composition and then wiped of and checked for application stain.

TABLE 1

| | EXAMPLE | | | | | | | | |
|---|---|---|---|---|---|---|---|---|---|
| | 1 | 2 | 3 | 4 | 5 | 6 | C1 | 7 | C2 |
| Composition Formulation wt % | | | | | | | | | |
| Diethyleneglycoldiacrylate (SR 230) | 48.1 | 38.0 | 28.1 | 39.83 | 49.67 | 60.05 | 17.9 | 69.64 | 78.30 |
| 4EO Bisphenol-A dimethacrylate (CD 540) | 48.9 | 59.0 | 68.9 | 57.13 | 47.33 | 36.91 | 79.0 | 27.29 | 18.77 |
| IRGACURE ® 819 | 3.0 | 3.0 | 3.0 | 3.04 | 3.0 | 3.03 | 3.0 | 3.07 | 2.93 |
| Properties | | | | | | | | | |
| Refractive index of adhesive at 25° C. before cure | 1.5000 | 1.5065 | 1.5145 | — | — | — | 1.5220 | — | — |
| HMC transfer | Yes | Yes | Yes | Yes | Yes | Yes | Yes | Yes | Yes |
| Visual haze | 0 | 0 | 0 | 0 | 0 | 0 | 0 | 1 | 2 |
| Hazeguard | — | — | — | 0 | 0.04 | 0.07 | — | 0.15 | 0.38 |
| Application stain | 0 | 0 | 0 | 0 | 0 | 0 | 0 | 1 | 2 |
| Adhesion | 0 | 0 | 0 | 0 | 0 | 0 | 5 | 0 | 0 |
| Tc (° C.) | 50 | 50 | 50 | 70 | 60 | 70 | 50 | 70 | 70 |

For comparative example C3, both tinted lenses exhibit with the same result.

Composition formulations and results are given in Table 2 below:

TABLE 2

| | EXAMPLE | | | | | | |
|---|---|---|---|---|---|---|---|
| | 8 | 9 | 10 | 11 | 12 | 13 | C3 |
| Composition Formulation wt % | Blue tinted | | | Green tinted | | | Blue and green tinted lenses |
| Diethyleneglycoldiacrylate (SR 230) | 28.1 | 38.0 | 48.1 | 30.35 | 34.88 | 39.79 | 24.3 |
| 4EO Bisphenol-A dimethacrylate (CD 540) | 68.9 | 59.0 | 48.9 | 66.69 | 62.01 | 57.15 | 29.1 |
| Bis(methacryloylthioethyl)sulfide | — | — | — | — | — | — | 43.7 |
| IRGACURE ® 819 | 3.0 | 3.0 | 3.0 | 2.96 | 3.11 | 3.06 | 2.9 |
| Application stain | 0 | 1 | 2 | 0 | 0-1 | 1 | 3 |

The results show that the composition of the invention are superior regarding application stain to ternary compositions containing a thiomethacrylate constituent when used with tinted lenses, and in particular for compositions according to the invention containing 28 to 42 parts by weight of component (A1) and 72 to 58 parts by weight of component (A2).

EXAMPLES 14 TO 16

Clear PC lenses are coated with HMC coating using BST process as disclosed in examples 1 to 7, with the following modifications:
- lenses are clear PC lenses (5.1 back curve-2.00 dioptries)
- carrier is a PC thermoformed carrier (5.5 back curve) 0.47 mm center thickness
- Inflatable membrane apparatus is an automated apparatus Composition formulations and properties are given in Table 3 below:

TABLE 3

|  | EXAMPLE | | |
|---|---|---|---|
|  | 14 | 15 | 16 |
| Composition Formulation wt % | | | |
| Diethyleneglycoldiacrylate (SR 230) | 30.35 | 34.88 | 39.79 |
| 4EO Bisphenol-A dimethacrylate (CD 540) | 66.69 | 62.01 | 57.15 |
| IRGACURE ® 819 | 2.96 | 3.11 | 3.06 |
| Properties | | | |
| HMC transfer | Yes | Yes | Yes |
| Visual haze | 0 | 0 | 0 |
| Application stain | 0 | 0 | 0 |
| Adhesion | <1 | <1 | 0 |
| Tc (° C.) | 50-70 | 50 | 50-60 |

EXAMPLES 17 TO 19

Examples 1 to 7 are repeated using thermoformed 5.5 back curve carriers, 5.1 back curve, −2.00 dioptries lenses and the composition formulations set forth in Table 5. The properties of the lenses are also given in table 5.

TABLE 4

|  | EXAMPLE | | |
|---|---|---|---|
|  | 17 | 18 | 19 |
| Composition Formulation wt % | | | |
| Diethyleneglycoldiacrylate (SR 230) | 27.9 | 27.74 | 27.86 |
| 4EO Bisphenol-A dimethacrylate (CD 540) | 45.62 | 22.86 | 45.89 |
| Tris(2-hydroxylethyl) isocyanurate triacrylate (SR368D) | 23.48 | 46.3 | — |
| Ditrimethylopropane tetra acrylate (SR355) | — | — | 23.26 |
| IRGACURE ® 819 | 3 | 3.09 | 2.99 |
| Properties | | | |
| HMC transfer | Yes | Yes | Yes |
| Visual haze | 0 | 0 | 0 |
| Application stain | 0 | 0 | 0 |
| Adhesion | 0 | 0 | 0 |
| Tc (° C.) | 60 | 60 | 60 |

EXAMPLES 20 TO 25

HMC coating transfer is made on 5.1 back curve PC lenses, 02.00 power, using injection molded PC carriers, 5.5 base curve, 0.56 mm center thickness and automated apparatus using the compositions of Table 5. The properties of the resulting coated lenses are also given in Table 5.

The HMC transfer lenses were made on the automated laminating equipment.

TABLE 5

|  | EXAMPLE | | | | | |
|---|---|---|---|---|---|---|
|  | 20 | 21 | 22 | 23 | 24 | 25 |
| Diethylene glycol diacrylate SR 230 (%) | 35.0 | 48.3 | 67.2 | 35.1 | 49.2 | 67.8 |
| 4EO Bisphenol-A dimethacrylate CD 540 (%) | 62.0 | 48.7 | 29.8 | 0.0 | 0.0 | 0.0 |
| 8EO Bispheol-A dimethacrylate CD 542 (%) | 0.0 | 0.0 | 0.0 | 61.9 | 47.7 | 29.2 |
| Irgacure ® 819 (%) | 3.0 | 3.0 | 3.0 | 3.0 | 3.1 | 3.0 |
| Lens after BST | Good | Good | Good | Good | Good | Good |
| HMC Transfer | Yes | Yes | Yes | Yes | Yes | Yes |
| Visual haze | 0 | 0 | 0 | 0 | 0 | 0 |
| Application stain | 0 | 0 | 0 | 0 | 0 | 1 |
| Adhesion | 0 | 0 | 0 | 0 | 0 | 0 |
| Critical temperature (° C.) | 50 | 50 | 50 | 50 | 50 | 50 |

Several commercially available photocurable adhesive compositions are used for coating transfer and tested as above.

Compositions and results are given in Table 6.

TABLE 6

| Company | Product | Cure Comments | X-htch Adhesion | Haze | Application stain | Tc (° c.) |
|---|---|---|---|---|---|---|
| Dymax Corporation | OP-4-20628 | CST | 0 | YES | YES | NT |
|  | OP-42B | IST/EC | 4-5 | NO | 0 | NT |
|  | X-301-44-2 | EC | 1 | NO | 0 | NT |
|  | X-415-102-A | IST/EC | 5 | n/a | n/a | NT |
|  | X-410-96-1 | IST/EC | 0 | NO | 0 | 50 |
|  | OP-4-20632 | NO TRANSFER | 5 | n/a | n/a | NT |
|  | OP-40 #54194 | CST | 5 | n/a | n/a | NT |
|  | 3-20256 #72521 | CST | 0 | YES | yes | NT |
|  | X-372-45-1 #00327 | CST | 0 | NO | ? | 50 |
|  | X-372-45-1 #03191 | CST | 0 | NO | no? | 50 |
|  | 1128M #28542-26083 | CST | 5 | YES | yes | NT |
|  | 1181-M #28542-27047 | IST | 0 | YES | yes | NT |

TABLE 6-continued

| Company | Product | Cure Comments | X-htch Adhesion | Haze | Application stain | Tc (° c.) |
|---|---|---|---|---|---|---|
| | 1186-M #28542-27887 | EC | 5 | YES | 0 | NT |
| | 1191-M #28542-23578 | EC | 0 | NO | 0 | NT |
| | 1-20560 #28542-25319 | EC | 0 | YES | 0 | NT |
| | OP-54 | NO TRANSFER | 5 | n/a | n/a | NT |
| | OP-30 | EC | 1-2 | YES | 0 | NT |
| | OP-61-LS | CURED OPAQUE | n/a | n/a | n/a | NT |
| | OP-21 | EC+ | 0 | NO | 0 | NT |
| | OP-29V | EC+ | 5 | n/a | n/a | NT |
| | OP-29V | EC+ | 1-2 | NO | 0 | NT |
| Norland | NOA 61 | IST/EC | 5 | n/a | n/a | NT |
| Optical | NOA 65 | IST/EC | 5 | n/a | n/a | NT |
| Adhesives | NOA 68 | IST/EC | 5 | n/a | n/a | NT |
| | NOA 81 | IST/EC | 5 | n/a | n/a | NT |
| | NOA 83H | e.c. | 5 | n/a | n/a | NT |
| Loctite | 3104-23694 | CST | 0 | YES | yes | NT |
| | 3105-23695 | CST | 0 | NO | 0 | 50 |
| | 3494 | IST | 0 | NO | 0 | 50 |
| | FT-01616 (X-245622) | IST | 0 | NO | 0 | 50 |
| Epoxy | EPO-TEK OG144 | CST | 5 | n/a | n/a | NT |
| Technology, INC. | EPO-TEK OG142-13 | IST/EC | 5 | n/a | n/a | NT |
| Summers | Type SK-9 Lens Bond | CST | 5 | n/a | n/a | NT |
| Optical | Type J-91 Lens Bond | IST | 5 | n/a | n/a | NT |
| S. C. Radco | 222A | CST | 5 | n/a | n/a | NT |
| Cyberlife | 4436 | CST/EC | 2-3 | NO | 0 | NT |

NT = not tested due to earlier failure
Cure comments abbreviations
CST Complete stack transfer
IST Incomplete stack transfer
EC Edge cracks during BST process
EC+ Extensive edge cracking
n/a non applicable Table 6 shows that almost none of the commercially available adhesives lead to final coated lenses having the whole set of required properties.

Example of Calculation of the Solubility Parameters.

The following example will show, step by step, how the solubility parameter for neopentylglycol diacrylate was calculated. The solubility parameter calculation is based on the technique of group contribution, which assumes that each functional group in a molecule contributes additively to a thermodynamic property. Hoy's group contribution values are derived from vapor pressure measurements.

The energy of vaporization is given by:

$$\Delta E^v = \Sigma_j n_j \Delta e_j$$

where $n_j$ is the number of groups of type j in the molecule, and $\Delta e_j$ is the energy of vaporization contribution for group j.

Hoy's (and others) group contribution values are reported as molar attraction constants (F), which are related to the energy of vaporization in the following way:

$$F_j = \sqrt{\Delta E^v_{i,j} V_{i,j}}$$

where $V_i$ is the molar volume of the molecule.

The solubility parameter ($\delta$) for a molecule is related to the molar attraction constants in the following way:

$$\delta_j = \sqrt{\frac{\Delta E^v_i V_i}{V_i^2}} = \frac{\Sigma_j F_j}{V_i} = \frac{\rho_{ij} \Sigma_j F_j}{M_i}$$

where $\rho_{ij}$ is the density of the molecule, and $M_i$ is the molecular weight.

Step 1

The molecule is deconstructed into the different functional groups which are listed by Hoy. FIG. 1 shows a ball-and-stick drawing of neopentylglycol diacrylate. The different functional groups have been numbered, with multiple occurrences of the same functional group being given the same number.

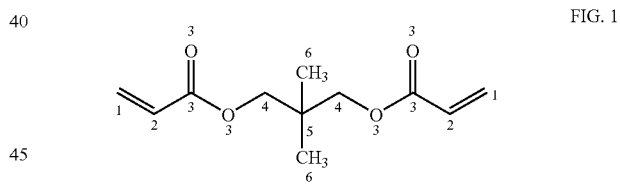

FIG. 1

3 = COO group

Step 2

The group contribution values of each functional group occurrence are tabulated (as shown in Table 7).

TABLE 7

| Group n° | Group Type | # of occurrences | Group contr. Value | Total group contr. Value |
|---|---|---|---|---|
| 1 | Unsat. =$CH_2$ | 2 | 259 | 518 |
| 2 | Unsat. =CH— | 2 | 249 | 498 |
| 3 | Carboxylic —COO— | 2 | 688 | 1376 |
| 4 | Sat. —$CH_2$— | 2 | 269 | 538 |
| 5 | Sat. =C= | 1 | 65 | 65 |
| 6 | Methyl —$CH_3$ | 2 | 303 | 606 |

Step 3

The total group contribution values are added, then multiplied by the monomer density, with the resultant number being divided by the monomer molecular weight. This yields the solubility parameter for the monomer.

Density of neopentylglycol diacrylates=1.031, and the molecular weight is 212 (Sartomer Co. Data).

(518+498+1376+65+606)=3601

(3601*1.031/212=17.51 (MPa)$^{1/2}$*{(cal/cm$^3$)$^{1/2}$/2.046 (MPa)$^{1/2}$}=8.56 (cal/cm$^3$)$^{1/2}$.

The invention claimed is:

1. A curable adhesive composition comprising, based on the total weight of the polymerizable monomers and/or oligomers of the composition:
   (A1) 20 to 80 wt % of at least one diacrylate monomer or oligomer thereof,
   (A2) 80 to 20 wt % of at least one polyalkoxylated bisphenol dimethacrylate or oligomer thereof;
   (B) 0 to 50 wt % of at least one copolymerizable monomer different from components (A1) and (A2);
   with the proviso that the composition is free from any thio (meth)acrylate (—SCOCR'=CH$_2$, with R'=H or CH$_3$) monomer or oligomer thereof.

2. The curable composition of claim 1, further defined as a photocurable composition.

3. The curable composition of claim 1, wherein the polyalkoxylated bisphenol dimethacrylate has the following formula:

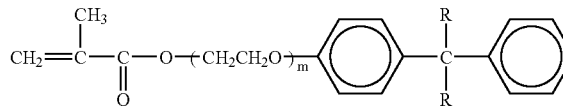 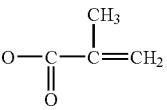

in which R is H or a C$_1$-C$_4$ alkyl radical and m+n≧0.

4. The curable composition of claim 3, wherein m+n≧2.

5. The curable composition of claim 1, comprising 20 to 71 wt % of component (A1) and 29 to 80 wt % of component (A2).

6. The curable composition of claim 1, comprising 28 to less than 71 wt % of component (A1) and 29 to 72 wt % of component (A2).

7. The curable composition of claim 1, comprising 28 to 42 wt % of component (A1) and 58 to 72 wt % of component (A2).

8. The curable composition of claim 1 comprising 30 wt % or less of component (B).

9. The curable composition of claim 1, comprising 20 wt % or less of component (B).

10. The curable composition of claim 1, comprising 10 wt % or less of component (B).

11. The curable composition of claim 1, comprising 0% of component (B).

12. The curable composition of claim 1, wherein said at least one diacrylate monomer (A1) has a calculated solubility parameter ranging from 8 to 12 (cal/cm$^3$)$^{1/2}$.

13. The curable composition of claim 1, wherein said at least one diacrylate monomer (A1) has a calculated solubility parameter ranging from 8.5 to 11.5 (cal/cm$^3$)$^{1/2}$.

14. The curable composition of claim 1, wherein said at least one diacrylate monomer (A1) has a molecular weight <500.

15. The curable composition of claim 1, wherein said at least one diacrylate monomer (A1) has a molecular weight ≦350.

16. The curable composition of claim 1, wherein said at least one monomer (A1) is a low refractive index monomer.

17. The curable composition of claim 1, wherein said monomer (A1) is a non-aromatic monomer.

18. The curable composition of claim 1, further comprising at least one photoinitiator.

19. The curable composition of claim 18, wherein the photoinitiator represents 0.1 to 5 parts by weight for 100 parts by weight of the polymerizable monomers and/or oligomers.

20. The curable composition of claim 1, wherein, after curing, the composition has a refractive index n$_D^{25}$ of 1.53 to 1.65.

21. A process for transferring a coating from a support onto a surface of a polymer material substrate comprising:
   providing a polymer material substrate having at least one main surface;
   providing a support having an internal surface bearing a coating and an external surface;
   depositing on the main surface of the substrate or on the coating a pre-measured amount of a curable adhesive composition comprising, based on the total weight of polymerizable monomer and/or oligomers of the composition:
   (A1) 20 to 80 wt % of at least one diacrylate monomer or oligomer thereof,
   (A2) 80 to 20 wt % of at least one polyalkoxylated bisphenol dimethacrylate or oligomer thereof;
   (B) 0 to 50 wt % of at least one copolymerizable monomer different from components (A1) and (A2);
   with the proviso that the composition is free from any thio(meth)acrylate (—SCOCR'=CH$_2$, with R'=H or CH$_3$) monomer or oligomer thereof;
   moving relatively to each other the substrate and the support to either bring the coating into contact with the curable composition or bring the curable composition into contact with the main surface of the substrate;
   applying a sufficient pressure onto the external surface of the support so that the thickness of a final layer, once the curable composition has cured is less than 100 μm;
   curing the layer of the composition to form a final cured layer; and
   withdrawing the support to recover a substrate with the coating adhered onto its main surface.

22. The process of claim 21, wherein the substrate polymer material is a thermoplastic material.

23. The process of claim 21, wherein the thermoplastic material of the substrate is polycarbonate.

24. The process of claim 21, wherein the curable composition comprises 20 to 71 wt % of component (A1) and 29 to 80 wt % of component (A2).

25. The process of claim 21, wherein the curable composition comprises 28 to 71 wt % of component (A1) and above 29 to 72 wt % of component (A2).

26. The process of claim 21, wherein the curable composition comprises 28 to 42 wt % of component (A1) and 58 to 72 wt % of component (A2).

27. The process of claim 21, wherein the curable composition comprises 30 wt % or less of component (B).

28. The process of claim 21, wherein the curable composition comprises 20 wt % or less of component (B).

29. The process of claim 21, wherein the curable composition comprises 10 wt % or less of component (B).

30. The process of claim 21, wherein the curable composition comprises 0% of component (B).

31. The process of claim 21, wherein said at least one diacrylate monomer (A1) has a calculated solubility parameter ranging from 8 to 12 $(cal/cm^3)^{1/2}$.

32. The process of claim 21, wherein said at least one diacrylate monomer (A1) has a calculated solubility parameter ranging from 8.5 to 11.5 $(cal/cm^3)^{1/2}$.

33. The process of claim 21, wherein said at least one diacrylate monomer (A1) has a molecular weight <500.

34. The process of claim 21, wherein said at least one diacrylate monomer (A)1 has a molecular weight $\leq 350$.

35. The process of claim 21, wherein said at least one monomer (A1) is a low refractive index monomer.

36. The process of claim 21, wherein said diacrylate monomer (A1) is a non-aromatic diacrylate monomer.

37. The process of claim 21, wherein the at least one polyalkoxylated bisphenol dimethacrylate monomer (A2) is an ethoxylated bisphenol-A monomer.

38. The process of claim 21, wherein the curable composition is a photocurable composition further comprising at least one photoinitiator.

39. The process of claim 38, wherein the photoinitiator represents 0.1 to 5 parts by weight for 100 parts by weight of the photopolymerizable monomers.

40. The process of claim 21, wherein the substrate is a lens blank, and the main surface is a geometrically defined surface of the lens blank.

41. The process of claim 21, wherein the substrate is a tinted substrate.

42. The process of claim 41, wherein the support is made of polycarbonate.

43. The process of claim 21, wherein the support is a flexible support part having an internal surface conformable to a geometrically defined surface of the lens blank when brought into contact therewith.

44. The process of claim 43, wherein the support has a thickness of 0.3 to 1 mm.

45. The process of claim 42, wherein the flexible support is urged against the lens blank by means of an inflatable membrane.

46. The process of claim 21, wherein the support is made of polycarbonate.

47. The process of claim 21, wherein the thickness of the final cured layer is less than 80 μm.

48. The process of claim 21, wherein the thickness of the final cured layer is less than 50 μm.

49. The process of claim 21, wherein the final cured layer has a refractive index $n_D^{25}$ of 1.53 to 1.65.

50. The process of claim 21, wherein the exerted pressure ranges from 5 to 50 Psi (0.35 to 3.5 $kjf/cm^3$).

51. The process of claim 21, wherein the coating comprises a hydrophobic top coat, an anti-reflective coating layer, an anti-abrasion coating layer, an impact resistant coating layer, a photochromic coating layer, a dying coating layer, a polarized coating layer, a printed layer or a stack of two or more of these coating layers.

52. The process of claim 51, wherein the coating has a thickness of 50 μm or less.

53. The process of claim 21, wherein the coating consists of a hydrophobic top coating, an anti-reflective coating layer, an anti-abrasion coating layer and an impact resistant coating layer.

54. The process of claim 21, wherein said at least one main surface of the substrate is a surface of a tinted coating formed on the substrate.

55. The process of claim 21, wherein the substrate is a semi-finished lens having one face already provided with a coating.

56. The process of claim 55, wherein the face already provided with a coating is the front face of the lens and the geometrically defined surface onto which the coating is transferred is the back surface of the lens.

57. The process of claim 21, wherein the support is made of a thermoplastic material.

58. The process of claim 56, wherein the substrate is made by injection molding.

59. An overmolding process comprising:
providing a polymer material substrate having at least one main surface;
providing a mold part having an internal surface and an external surface;
depositing on the main surface of the substrate or on the internal surface of the mold part a pre-measured amount of a curable adhesive composition comprising, based on the total weight of the polymerizable monomers and/or oligomers of the composition:
(A1) 20 to 80 wt % of at least one diacrylate monomer or oligomer thereof;
(A2) 80 to 20 wt % of at least one polyalkoxylated bisphenol dimethacrylate or oligomer thereof;
(B) 0 to 50 wt % of at least one copolymerizable monomer different from components (A1) and (A2);
with the proviso that the composition is free from any thio(meth)acrylate (—SCOCR'502 $CH_2$, with R'═H or $CH_3$) monomer or oligomer thereof;
moving relatively to each other the substrate and the mold part to either bring the internal surface of the mold part or the main surface of the substrate in contact with the curable composition;
applying a sufficient pressure onto the external surface of the mold part to uniformly spread the curable composition and form a uniform layer, which, when cured, has a thickness of at least 200 μm;
curing the layer of the composition to form a final cured layer; and
withdrawing the mold parts to recover the substrate overmolded with a cured layer of the curable composition.

60. The overmolding process of claim 59, wherein the polymer material of the substrate is a thermoplastic material.

61. The overmolding process of claim 59, wherein a coating to be transferred is applied to the internal surface of the mold part before depositing the curable composition.

62. A process for transferring a coating from a support onto a surface of a polymer material substrate comprising:
providing a polymer material substrate having at least one main surface;
providing a support having an internal surface bearing a coating and an external surface;
depositing on the main surface of the substrate or on the coating a pre-measured amount of a curable adhesive composition comprising, based on the total weight of polymerizable monomer and/or oligomers of the composition:
(A1) 20 to 80 wt % of at least one diacrylate monomer or oligomer thereof (A2) 80 to 20 wt % of at least one polyalkoxylated bisphenol dimethacrylate or oligomer thereof;

(B) 0 to 50 wt % of at least one copolymerizable monomer different from components (A1) and (A2);

with the proviso that the composition is free from any thio(meth)acrylate (—SCOCR'=CH$_2$, with R'=H or CH$_3$) monomer or oligomer thereof;

moving relatively to each other the substrate and the support to either bring the coating into contact with the curable composition or bring the curable composition into contact with the main surface of the substrate;

applying a sufficient pressure onto the external surface of the support so that the thickness of a final layer, once the curable composition has cured is less than 100 μm;

curing the layer of the composition to form a final cured layer; and withdrawing the support to recover a substrate with the coating adhered onto its main surface, wherein the support is a flexible support part having a thickness of 0.3 to 1 mm and having an internal surface conformable to a geometrically defined surface of the lens blank when brought into contact therewith.

63. A process for transferring a coating from a support onto a surface of a polymer material substrate comprising:

providing a polymer material substrate having at least one main surface;

providing a support having an internal surface bearing a coating and an external surface;

depositing on the main surface of the substrate or on the coating a pre-measured amount of a curable adhesive composition comprising, based on the total weight of polymerizable monomer and/or oligomers of the composition:

(A1) 20 to 80 wt % of at least one diacrylate monomer or oligomer thereof;

(A2) 80 to 20 wt % of at least one polyalkoxylated bisphenol dimethacrylate or oligomer thereof;

(B) 0 to 50 wt % of at least one copolymerizable monomer different from components (A1) and (A2);

with the proviso that the composition is free from any thio(meth)acrylate (—SCOCR'=CH$_2$, with R'=H or CH$_3$) monomer or oligomer thereof;

moving relatively to each other the substrate and the support to either bring the coating into contact with the curable composition or bring the curable composition into contact with the main surface of the substrate;

applying a sufficient pressure onto the external surface of the support so that the thickness of a final layer, once the curable composition has cured is less than 80 μm;

curing the layer of the composition to form a final cured layer; and withdrawing the support to recover a substrate with the coating adhered onto its main surface.

64. The process of claim 63, wherein the thickness of the final cured layer is less than 50 μm.

65. A process for transferring a coating from a support onto a surface of a polymer material substrate comprising:

providing a polymer material substrate having at least one main surface;

providing a support having an internal surface bearing a coating and an external surface;

depositing on the main surface of the substrate or on the coating a pre-measured amount of a curable adhesive composition comprising, based on the total weight of polymerizable monomer and/or oligomers of the composition:

(A1) 20 to 80 wt % of at least one diacrylate monomer or oligomer thereof;

(A2) 80 to 20 wt % of at least one polyalkoxylated bisphenol dimethacrylate or oligomer thereof;

(B) 0 to 50 wt % of at least one copolymerizable monomer different from components (A1) and (A2);

with the proviso that the composition is free from any thio(meth)acrylate (—SCOCR'502 CH$_2$, with R'502 H or CH$_3$) monomer or oligomer thereof;

moving relatively to each other the substrate and the support to either bring the coating into contact with the curable composition or bring the curable composition into contact with the main surface of the substrate;

applying a sufficient pressure onto the external surface of the support so that the thickness of a final layer, once the curable composition has cured is less than 100 μm, wherein the exerted pressure ranges from 5 to 50 Psi (0.35 to 3.5 kjf/cm$^3$);

curing the layer of the composition to form a final cured layer; and withdrawing the support to recover a substrate with the coating adhered onto its main surface.

66. A process for transferring a coating from a support onto a surface of a polymer material substrate comprising:

providing a polymer material substrate having at least one main surface;

providing a support having an internal surface bearing a coating and an external surface;

depositing on the main surface of the substrate or on the coating a pre-measured amount of a curable adhesive composition comprising, based on the total weight of polymerizable monomer and/or oligomers of the composition:

(A1) 20 to 80 wt % of at least one diacrylate monomer or oligomer thereof;

(A2) 80 to 20 wt % of at least one polyalkoxylated bisphenol dimethacrylate or oligomer thereof;

(B) 0 to 50 wt % of at least one copolymerizable monomer different from components (A1) and (A2);

with the proviso that the composition is free from any thio(meth)acrylate (—SCOCR'=CH$_2$, with R'=H or CH$_3$) monomer or oligomer thereof;

moving relatively to each other the substrate and the support to either bring the coating into contact with the curable composition or bring the curable composition into contact with the main surface of the substrate;

applying a sufficient pressure onto the external surface of the support so that the thickness of a final layer, once the curable composition has cured is less than 100 μm;

curing the layer of the composition to form a final cured layer; and withdrawing the support to recover a substrate with the coating adhered onto its main surface, wherein the coating has a thickness of 50 μm or less and comprises a hydrophobic top coat, an anti-reflective coating layer, an anti-abrasion coating layer, an impact resistant coating layer, a photochromic coating layer, a dying coating layer, a polarized coating layer, a printed layer or a stack of two or more of these coating layers.

67. The curable composition of claim 1, wherein monomer (A1) is diethyleneglycol diacrylate, triethyleneglycol diacrylate, tetraethyleneglycol diacrylate, neopentylglycoldiacrylate or 1,6-hexanediol diacrylate.

68. The process of claim 21, wherein monomer (A1) is diethyleneglycol diacrylate, triethyleneglycol diacrylate, tetraethyleneglycol diacrylate, neopentyiglycoldiacrylate or 1,6-hexanediol diacrylate.

69. The overmolding process of claim 59, wherein the overmolded cured layer of the curable composition has a thickness of at least 500 μm.

70. A process for making laminated thermoplastic articles comprising depositing a pre-measured amount of a curable adhesive composition on a main surface of a first part made of polymer material, bringing into contact the deposited curable composition with a main surface of a second part made of a polymer material, pressing the first and second parts against each other to uniformly spread the curable composition to form a uniform thin layer, and photocuring the thin layer to obtain a laminated article, wherein the photocurable composition comprises, based on the total weight of the polymerizable monomers and/or oligomers of the composition:

(A1) 20 to 80 wt % of at least one diacrylate monomer or oligomer thereof;

(A2) 80 to 20 wt % of at least one polyalkoxylated bisphenol dimethacrylate or oligomer thereof;

(B) 0 to 50 wt % of at least one copolymerizable monomer different from components (A1) and (A2);

with the proviso that the composition is free from any thio(meth)acrylate (—SCOCR'=$CH_2$, with R'=H or $CH_3$) monomer or oligomer thereof.

71. The process of claim 70, wherein the polymer materials of first and second parts are thermoplastic materials.

72. The process of claim 70, wherein the article is an ophthalmic lens.

* * * * *

UNITED STATES PATENT AND TRADEMARK OFFICE
CERTIFICATE OF CORRECTION

PATENT NO. : 7,439,278 B2
APPLICATION NO. : 10/838840
DATED : October 21, 2008
INVENTOR(S) : Aref Jallouli Page 1 of 1

It is certified that error appears in the above-identified patent and that said Letters Patent is hereby corrected as shown below:

In claim 21, column 26, line 27, delete "thereof," and insert --thereof;-- therefor.

In claim 34, column 27, line 18, delete "(A)1" and insert --(A1)-- therefor.

In claim 59, column 28, line 36, delete "SCOCR'502CH$_2$" and insert --SCOCR'=CH$_2$-- therefor.

In claim 65, column 30, line 8, delete "SCOCR'502CH$_2$" and insert --SCOCR'=CH$_2$-- therefor.

In claim 65, column 30, line 8, delete "R'502 H" and insert --R'=H-- therefor.

In claim 68, column 30, line 66, delete "neopentyiglycoldiacrylate" and insert --neopentylglycodiacrylate-- therefor.

Signed and Sealed this

Thirteenth Day of January, 2009

JON W. DUDAS
*Director of the United States Patent and Trademark Office*